Figures 1, 2:
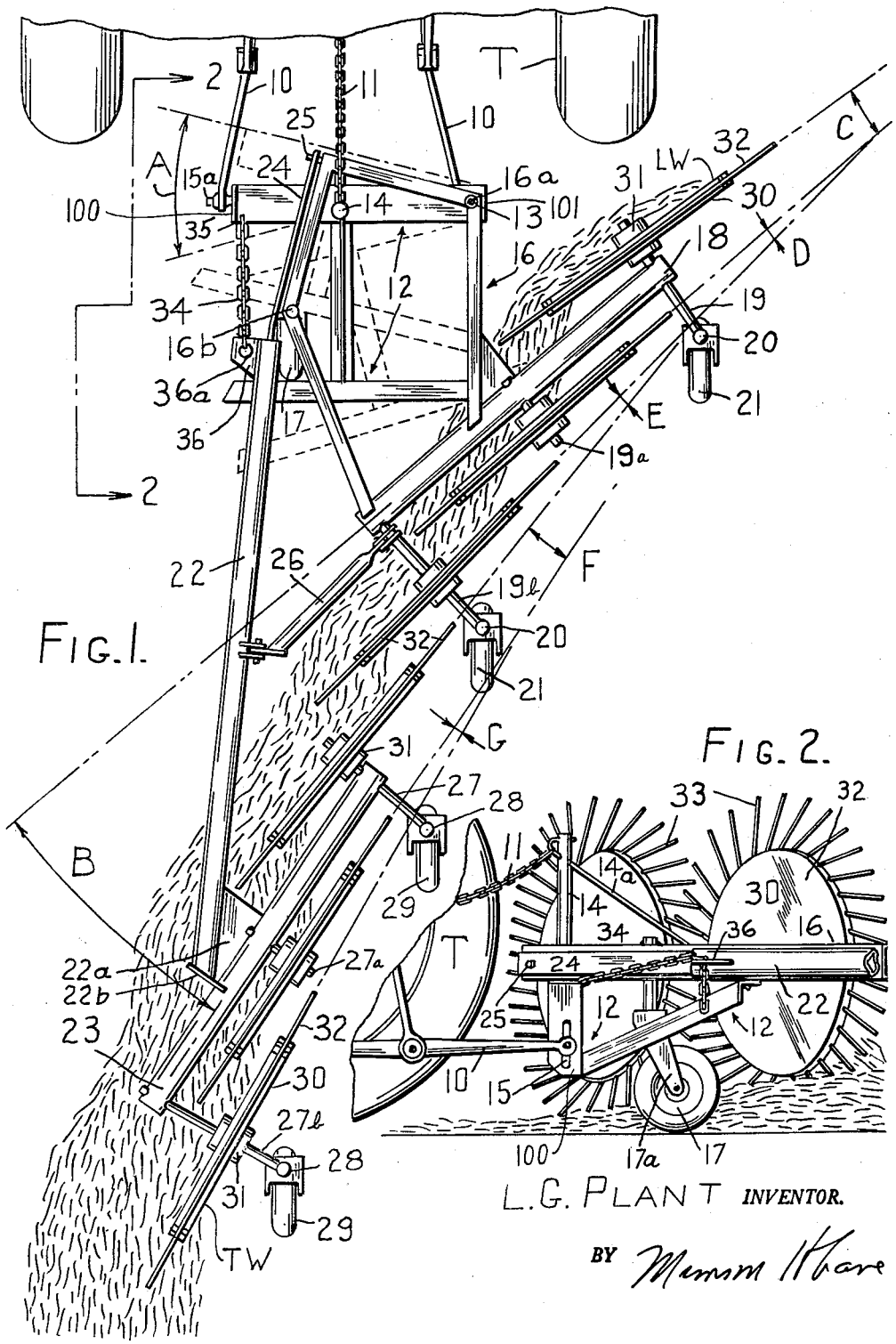

Feb. 23, 1960 L. G. PLANT 2,925,702
ADJUSTABLY MOUNTED SIDE DELIVERY RAKE
Filed Feb. 15, 1957

L.G. PLANT INVENTOR.

BY *Mumm Hare*

United States Patent Office 2,925,702
Patented Feb. 23, 1960

2,925,702

ADJUSTABLY MOUNTED SIDE DELIVERY RAKE

Leland G. Plant, Edenton, N.C.; Pattie Louise Moore Plant, executrix of said Leland G. Plant, deceased, assignor to Munson H. Lane, trustee, Washington, D.C.

Application February 15, 1957, Serial No. 640,430

15 Claims. (Cl. 56—377)

This invention relates to new and useful improvements in raking apparatus, particularly of the type wherein a set of raking wheels, equipped with projecting tines at their peripheries, are disposed in radially overlapped relation for rotation in vertical planes oblique to the direction of travel of the apparatus so as to rake a swath approximating the width of the wheel group as projected upon a plane perpendicular to the direction of travel and to produce a side windrow stemming from the trailing wheel.

The present application is related to the application of Leland G. Plant and George C. Wood, Serial No. 564,211, filed February 8, 1956, now Patent No. 2,853,846, in that in both cases the raking wheels are mounted in echelon on axes fixed to a frame which is vertically movable with reference to a towing vehicle or tractor, and in both cases the frame is mounted upon triangularly arranged caster wheels.

The present application is also related to my application Serial No. 564,238, filed February 8, 1956, in that in both cases the frames upon which the raking wheel carrying axles are fixedly mounted are adjustable in a horizontal plane relative to the towing vehicle, and in addition the frame is vertically movable relative to the towing vehicle and is supported by triangularly arranged caster wheels.

In conventional rakes of this type the raking wheels are disposed in parallel vertical planes and as the rake is drawn over the ground, the hay picked up by each raking wheel is passed on to the next wheel in the set until it is eventually discharged by the last or trailing wheel to form the windrow, as above noted. Consequently, while the leading wheel in the set deals only with the quantity of hay picked up by itself, each successive wheel in the set deals not only with the hay picked up thereby, but also with additional quantities of hay which are progressively transferred thereto by the preceding wheels. It therefore follows that the total quantity of hay handled by each wheel progressively increases from the front to the rear of the set, the leading wheel handling the smallest and the trailing wheel the largest amount.

The conventional parallel disposition of the raking wheels does not compensate for this variation of load on the respective wheels and I have found that in order to effect the maximum efficiency in the performance of each wheel, the plane of rotation of the wheel should be individually related to the direction of travel in which the rake is drawn.

It is, therefore, an object of the instant invention to effect such individually related relationship of the raking wheels in the set, this being attained by disposing the wheels in vertical planes of rotation which are oblique to the direction of travel of the rake, but wherein such planes of rotation of the respective wheels are horizonally angularly offset from one another. As such, the plane of rotation of the leading wheel in the set is most oblique to the direction of travel of the rake, the planes of the successive wheels are progressively less oblique, and the plane of the trailing wheel is least oblique to the direction of travel. Since the width of the swath picked up by each wheel is more-or-less directly proportional to its angular disposition with respect to the direction in which the wheel is drawn, the most oblique leading wheel is thus able to pick up a relatively large amount of hay, while the amount picked up by the successive wheels progressively decreases from front to rear of the set. In this manner, the wheels arranged in accordance with the invention effectively compensate in terms of progressively decreasing amounts of picked up hay for the progressively increasing amounts of hay which are transferred from each wheel to the next, whereby the loading on the several wheels is generally uniform and maximum operating efficiency of each wheel is attained.

The rake structure in accordance with the invention is well adapted for use as an attachment to a tractor, and an important feature of the invention resides in the provision of a frame for supporting the aforementioned raking wheels, together with means for adjusting the frame relative to the tractor by which the attachment is drawn, so that the obliquely disposed raking wheels may be sustained at various predetermined angles to the direction of travel of the tractor and the width of the swath raked by the wheels correspondingly varied. The weight of the frame is wholly supported upon ground engaging means herein shown as casters which are free to swivel and maintain a parallel position relative to the direction of travel of the tractor, regardless of the angular disposition of the frame with respect to such direction.

Another important feature of the invention is derived from the aforementioned frame adjusting means which are so arranged that the rake attachment and the tractor drawing the same may execute sharp turns at the ends of each swath, without dragging the attachment laterally over the ground and without the conventional need for raising the attachment off the ground at such points to eliminate the dragging.

Another important feature of the invention resides in the provision of means for attaching the frame of the rake to the usual power lift mechanism of the tractor in such manner as to permit the tractor and the rake attachment to laterally rock independently of each other while travelling over uneven ground, whereby any such lateral rocking movement of the tractor is not transmitted to the rake, and vice versa.

With the above more important objects and features in view and such other objects and features as may become apparent as this specification proceeds, the invention will be understood from the following description taken in conjunction with the accompanying drawings, wherein like characters of reference are used to designate like parts, and wherein for illustrative purposes:

Figure 1 is a top plan view of a rake in accordance with the invention, attached to a tractor only a portion of which is shown; and Figure 2 is a fragmentary side elevational view, taken substantially in the plane of the line 2—2 in Figure 1.

Referring now to the accompanying drawings in detail, the tractor is designated by the reference character T and is provided with a conventional power lift mechanism including a pair of transversely spaced arms 10 to which the rake attachment is connected in a manner hereinafter described. A third point of connection of the rake attachment to the tractor is effected by a length of chain 11 which is attached to the tractor at a suitable point above the arms 10.

The rake attachment embodies in its construction a sub-frame 12 provided at one side thereof with an upstanding pivot pin 13. The sub-frame is also provided with a central, upstanding post or standard 14, reinforced by a brace 14a, the aforementioned chain 11 being attached to the upper end of this standard, as shown. Transversely spaced side portions 100, 101 of the sub-frame 12 are provided with a pair of vertical slots 15 accommodating a horizontal pivot bar or rod 15a which passes through the rear ends of the arms 10 and is slidable vertically in the slots 15.

The rake attachment also comprises a main frame 16 which is of an articulated construction and includes frame sections 18 and 22 which are movable independently of one another in vertical planes, as will be hereinafter explained. The main frame 16 is provided with vertical, tubular sockets 16a and 16b, the former of which has rotatably fastened therein the aforementioned pivot pin 13 so that the main frame as a whole may be swung horizontally about the pivot pin 13 as indicated by the arrow A, to vary the angular relationship of the main frame with respect to the tractor T and, consequently, the direction of travel of the tractor and rake attachment.

The socket 16b accommodates therein the stem (not shown) of a yoke 17a of a travelling or ground engaging caster 17.

The frame section 18 is provided with horizontal axle shafts 19, 19a and 19b having the hubs 31 of the raking wheels 32 rotatably mounted thereon. The axle shafts 19 and 19b are also provided with vertical pedestals 20 which, in turn, are equipped at their lower ends with travelling casters 21, similar to the caster 17. Structural details of the caster mounting may be of the type more fully disclosed in my Patent No. 2,727,351.

The frame section 22 has rigidly secured thereto a member 23 by means of a horizontal gusset plate 22a and a vertical plate 22b and has also suitably secured rigidly thereto a bar 24 as by welding which bar is pivotally mounted on a horizontal pin 25 provided on the frame 16. An intermediate portion of the section 22 is connected by a pivoted link 26 to the axle shaft 19b on the frame section 18, it being apparent from the foregoing that the pivotal attachment of the bar 24 to the pin 25 and the link 26 permit the frame sections 18 and 22 to rise and fall independently of each other as the apparatus travels over uneven ground.

The member 23 is provided with additional axle shafts 27, 27a and 27b similar to the shafts 19, 19a and 19b having additional raking wheels 32 rotatably mounted thereon, the shafts 19, 19a and 19b and 27, 27a and 27b being disposed in substantially the same or a parallel plane when the apparatus is on even ground, although the group of shafts 27, 27a and 27b on the member 23 may rise and fall at various inclinations independently of the group of shafts 19, 19a and 19b on the section 18, as already explained, when uneven ground conditions are encountered. It will be noted that the axle shafts 19, 19a and 19b and 27, 27a and 27b project rigidly from the frame in substantially horizontal positions.

The axle shafts 27 and 27b are provided with pedestals 28 equipped with travelling casters 29 similar to the casters 21, it being understood that the various casters 17, 21 and 29 are free to swivel and maintain a parallel position relative to the direction of travel of the tractor, regardless of the angular disposition of the frame 16, 18, 22 with respect to such direction.

The raking wheels 32 are provided at the periphery thereof with suitable raking tines 33 and, in accordance with the customary practice, are radially overlapped, as shown. Moreover, the wheels 32 are rotatable in vertical planes disposed obliquely to the direction of travel of the tractor, but the planes of rotation of the several wheels are not mutually parallel. Rather, these planes of wheel rotation are horizontally angularly offset, one from another, the plane of rotation of the leading wheel in the set being most oblique to the direction of travel of the tractor, while the planes of rotation of the successive wheels are progressively of lesser oblique angularity, with the trailing wheel in the set being least oblique to the direction of travel. The angular offsets between the planes of rotation of the various wheels are indicated by the arrows C, D, E, F and G, while the arrow B indicates the angular relationship between the frame section 18 and the member 23 which is well suited for the relative angular disposition of the raking wheels as described.

In actual practice, the angles C, D, E, F and G may be approximately 2° each in magnitude where a rake with wheels rotating in conventionally parallel planes would have the wheels disposed at 45° to the direction of travel. Under such circumstances, in accordance with the invention the plane of the leading wheel LW may be at 55° and the plane of the trailing wheel TW at 45° to the direction of travel.

Since the width of the swath made by each wheel is more-or-less proportional to the angularity of the plane of wheel rotation to the direction of travel, it will be apparent from the foregoing that the amount of hay picked up by the most obliquely disposed leading wheel in the set will be the largest, and will progressively decrease with each successive wheel until it is the smallest at the least obliquely disposed trailing wheel. Since the hay picked up by each wheel is progressively transferred to the successive wheels in progressively greater amounts from the front to the rear of the set, the relative angular disposition of the several wheels tends to compensate in terms of the amounts of hay picked up for the amounts of hay transferred from wheel to wheel, so that the several wheels can be adjusted to operate with respect to each at its most efficient angle relative to the amount of hay picked up and shifted toward the windrow.

The angular relationship of the wheel-carrying frame with respect to the tractor and its direction of travel may be adjusted so as to correspondingly adjust the width of the swath taken by the several wheels. This adjustment is effected by simply altering the position of the frame 16 with respect to the sub-frame 12 as indicated by the arrow A. The frame 16 is sustained in a predetermined position with respect to the sub-frame 12 by a flexible element such as a length of chain 34 which is attached at one end 35 thereof to the sub-frame 12 and has the other end portion thereof adjustably held in a keyhole-shaped opening 36a in a bracket 36 secured to the frame section 22. As will be readily apparent from the above description the flexible element or chain 34, together with its adjustable connections, comprise adjustable means for sustaining the main frame at a predetermined angular relationship with respect to the sub-frame, and the sub-frame 12, taken with the linkage 10, 11, described in column 2, lines 65 to 70, and the adjustable chain or cable 34 connecting the sub-frame to the main frame, together constitute means for operatively attaching the main frame carrying the raking wheels to the tractor at variously fixed angles, adjustable at will relative to the tractor whereby to vary the oblique angular disposition of the raking wheels relative to the direction of travel.

The draft of the rake attachment is such as to normally maintain the chain 34 taut, but it is to be particularly noted that when the tractor reaches the end of the swath and requires to be turned around before taking the next swath, turning of the tractor in the left direction will permit the chain 34 to become slack, so that the tractor and the rake attachment may turn a relatively sharp corner without dragging the attachment laterally over the ground or necessitating raising of the attachment off the ground to prevent such dragging. When it is desired to raise the attachment off the ground, such as for example, for purposes of transportation from one location to another, the power lift mechanism of the tractor is simply actuated to raise the arms 10. This action will cause the rod 15a to slide upwardly in the slots 15, where-upon the attachment will become raised and the chain 11 tightened by the raising of the attachment, so that the same is lifted bodily off the ground.

In operation, the sliding arrangement of the rod 15a in the slots 15 permits the tractor and the attachment to rock laterally independently of each other while travelling over uneven ground, so that any such lateral rocking of the tractor is not transmitted to the attachment and vice versa, the raking wheels being supported at a proper operating height above the ground by the ground engaging means in the form of casters 17, 21 and 29, without depending upon the tractor hitch to provide such support. It is to be noted also that the connection of the arms 10 at transversely spaced points to the sub-frame 12 positively prevents any lateral shifting of the sub-frame relative to the tractor under lateral pressure from the raking wheels, so that once the angular relationship of the main frame 16, 18, 22 to the sub-frame 12 is fixed by adjustment of the chain 34, the planes of rotation of the respective raking wheels relative to the direction of travel of the tractor remain in fixed angular relationships.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. The combination of a tractor having a power lift mechanism including a pair of transversely spaced lift arms, and a raking attachment comprising a frame, a plurality of axles fixed upon said frame, a set of radially overlapping raking wheels mounted on said axles for rotation in substantially vertical planes disposed obliquely to the direction of travel of the tractor, said frame being provided at transversely spaced points thereon with a pair of vertical slots, and horizontal pivot means provided on said lift arms and movable vertically in said slots, whereby said tractor and said frame may rock laterally independently of each other in response to unevenness of the ground over which the same are travelling, and ground engaging means wholly supporting the frame independently of the tractor.

2. The combination of a tractor having a power lift mechanism including a pair of transversely spaced lift arms, and a raking attachment comprising a sub-frame having a vertical pivot and provided at transversely spaced points thereon with a pair of vertical slots, a main frame attached to said pivot for horizontal angular adjustment relative to said sub-frame, triangularly spaced casters provided on said main frame for its support, a plurality of axles fixed upon said frame, a set of radially overlapping raking wheels mounted on said axles for rotation in substantially vertical planes disposed obliquely to the direction of travel of the tractor, adjustable means operatively associated with the main and sub-frames for sustaining the main frame at a predetermined angular relationship with respect to the sub-frame, and horizontal pivot means provided on said lift arms and movable vertically in said slots, whereby said tractor and said raking attachment may rock laterally independently of each other in response to unevenness of the ground over which the same are traveling, the entire weight of the sub-frame and main frame being supported by said casters independently of the tractor.

3. A raking attachment for tractors as set forth in claim 2, wherein a plurality of said casters are mounted on pedestals fixed to the extremities of the axle shafts.

4. In a raking attachment for tractors, the combination of an articulated frame adapted to be drawn behind a tractor and including a plurality of sections movable independently of one another in vertical planes, a plurality of axles fixed upon the sections of said frame, a set of radially overlapping raking wheels mounted on said axles for rotation in substantially vertical planes disposed obliquely to the direction of travel of the tractor, the plane of rotation of each wheel being horizontally angularly offset from the respective planes of rotation of the other wheels in the set, ground engaging means supporting the entire weight of the articulated frame independent of the tractor comprising travelling casters provided on the sections of said frame, and means operatively associated with said frame and said tractor for adjusting said frame relative to the tractor whereby to vary the oblique angular disposition of said wheels relative to said direction of travel.

5. A raking attachment for tractors as set forth in claim 4, wherein a plurality of said casters are fixed to the extremities of the axle shafts.

6. In a raking attachment for tractors, the combination of an articulated frame adapted to be drawn behind a tractor and including a plurality of sections movable independently of one another in vertical planes, a plurality of axles fixed upon the sections of said frame, a set of radially overlapping raking wheels mounted on said axles for rotation in substantially vertical planes disposed obliquely to the direction of travel of the tractor, the plane of rotation of the leading wheel in the set being most oblique to said direction of travel and the respective planes of rotation of the successive wheels in the set being progressively horizontally angularly offset from the plane of rotation of the leading wheel whereby the plane of rotation of the trailing wheel in the set is least oblique to said direction of travel, ground engaging means supporting the entire weight of the articulated frame independent of the tractor comprising travelling casters provided on the sections of said frame, and means operatively associated with said frame and said tractor for adjusting said frame relative to the tractor whereby to vary the oblique angular disposition of said wheels relative to said direction of travel.

7. In a raking attachment for tractors, the combination of a sub-frame adapted to be drawn behind a tractor and having a vertical pivot thereon, an articulated main frame attached to said pivot for horizontal angular adjustment relative to said sub-frame, adjustable means operatively associated with the main and sub-frames for sustaining the main frame at a predetermined angular relationship with respect to the sub-frame, said main frame including a plurality of sections movable independently of one another, responsive to contour of the ground above which each section is supported, ground engaging means supporting the entire weight of the articulated frame independent of the tractor comprising travelling casters provided on each section of said main frame, a plurality of axles fixed upon said sections, and a set of radially overlapped raking wheels mounted on said axles for rotation in substantially vertical planes disposed obliquely to the direction of travel of the tractor, the plane of rotation of each wheel being horizontally angularly offset from the respective planes of rotation of the other wheels in the set and the plane of rotation of the trailing wheel in the set being at least oblique to said direction of travel.

8. A raking attachment for tractors as set forth in claim 7, wherein a plurality of said casters are fixed to the extremities of the axle shafts.

9. In a raking apparatus, a set of radially overlapped raking wheels rotatable in vertical planes disposed in fixed angular relation to one another and obliquely to the direction of travel of the apparatus, the plane of rotation of each wheel being horizontally angularly offset from the respective planes of rotation of the other wheels in the set.

10. In a raking apparatus, a set of radially overlapped raking wheels rotatable in vertical planes disposed in fixed angular relation to one another and obliquely to the direction of travel of the apparatus, the plane of rotation of the leading wheel in the set being most oblique to said direction of travel and the respective planes of rotation of the successive wheels in the set being progressively horizontally angularly offset from the plane of rotation of the leading wheel, whereby the plane of rotation of the trailing wheel in the set is least oblique to said direction of travel.

11. In a raking apparatus, the combination of a tractor, a frame adapted to be adjustably secured to the tractor but movable relative thereto in a vertical plane, a set of raking wheel axles fixed upon said frame, a set of radially overlapping raking wheels mounted in echelon on said axles for rotation in substantially vertical planes disposed obliquely to the direction of travel of the tractor, connecting means operatively attaching said frame to the tractor, said connecting means being adjustable at will to vary the oblique angular disposition of said set of raking wheels relative to the direction of travel, said connecting means including means permitting relative movement in a vertical plane between said tractor and said frame, and ground engaging means wholly supporting the frame at a fixed distance above the ground independently of the tractor.

12. A raking apparatus as set forth in claim 11, wherein the plane of rotation of each raking wheel is horizontally angularly off-set from the respective planes of rotation of the other wheels in the set, the plane of rotation of the leading wheel in the set being most oblique to the direction of travel and the respective planes of rotation of the successive wheels in the set being progressively horizontally angularly off-set from the plane of rotation of the leading wheel, whereby the plane of rotation of the trailing wheel of the set is least oblique to said direction of travel.

13. In a raking apparatus, the combination of a tractor, a sub-frame adapted to be secured to the tractor and having a vertical pivot thereon, a main frame having raking wheel axles fixedly secured thereto and projecting therefrom, said frame being attached to said vertical pivot to permit horizontal angular movement of said main frame relative to said sub-frame, means adjustably connecting the main frame at a predetermined angular relationship in a horizontal plane with reference to the sub-frame, a set of radially overlapping raking wheels mounted on said fixed axles projecting from said main frame, said raking wheels being rotatable in vertical planes disposed obliquely to the direction of travel, means connecting the sub-frame to the tractor to permit vertical movement of said sub-frame relative to the tractor, and ground engaging means, independent of the tractor, said ground engaging means supporting the sub-frame and main frame at a fixed distance above the ground.

14. The combination as defined in claim 13 wherein said adjustable connecting means includes a flexible element connected to said main frame and to said sub-frame at points spaced radially from said pivot.

15. In a raking apparatus, the combination of a tractor, a frame adjustably connected to the tractor, a plurality of raking wheel axles fixed upon and projecting from said frame, a set of radially overlapping raking wheels mounted on said axles for rotation in substantially vertical planes disposed obliquely to the direction of travel of the tractor, the plane of rotation of each wheel of the set being horizontally angularly off-set from the respective planes of rotation of the other wheels of the set and the plane of rotation of the leading wheel in the set being most oblique to the direction of travel and the respective planes of rotation of the successive wheels in the set being progressively horizontally angularly off-set from the plane of rotation of the leading wheel, whereby the plane of rotation of the trailing wheel in the set is least oblique to said direction of travel.

References Cited in the file of this patent

UNITED STATES PATENTS

| | | |
|---|---|---|
| 2,447,354 | Morrill | Aug. 17, 1948 |
| 2,693,969 | Simpson | Nov. 9, 1954 |
| 2,727,351 | Plant | Dec. 20, 1955 |

FOREIGN PATENTS

| | | |
|---|---|---|
| 1,108,778 | France | Sept. 14, 1955 |
| 1,104,540 | France | Nov. 21, 1955 |
| 186,451 | Austria | Aug. 10, 1956 |